United States Patent [19]

Plummer

[11] 4,204,269

[45] May 20, 1980

[54] OPTICAL ELEMENT FOR REDISTRIBUTING THE LIGHT OUTPUT OF A PHOTOFLASH LAMP ASSEMBLY OR THE LIKE

[75] Inventor: William T. Plummer, Concord, Mass.

[73] Assignee: Polaroid Corporation, Cambridge, Mass.

[21] Appl. No.: 864,316

[22] Filed: Dec. 27, 1977

[51] Int. Cl.² .............................................. G03B 15/02
[52] U.S. Cl. .................................... 362/17; 362/310; 362/328; 362/329
[58] Field of Search .................. 362/16, 17, 310, 328, 362/329

[56] References Cited

U.S. PATENT DOCUMENTS 4,104,707  8/1978  Schneider .............................. 362/17

*Primary Examiner*—Stephen J. Lechert, Jr.
*Attorney, Agent, or Firm*—Francis J. Caufield

[57] ABSTRACT

A photographic camera of the type which is adapted to utilize an artificial lighting assembly, e.g. a flashcube, for illuminating a scene to be photographed is provided with an optical element for intercepting light rays from the artificial lighting assembly to change its light distribution in a manner whereby the distribution of the intensity of illumination falling on the scene is made more uniform than it would otherwise be absent the optical element.

22 Claims, 12 Drawing Figures

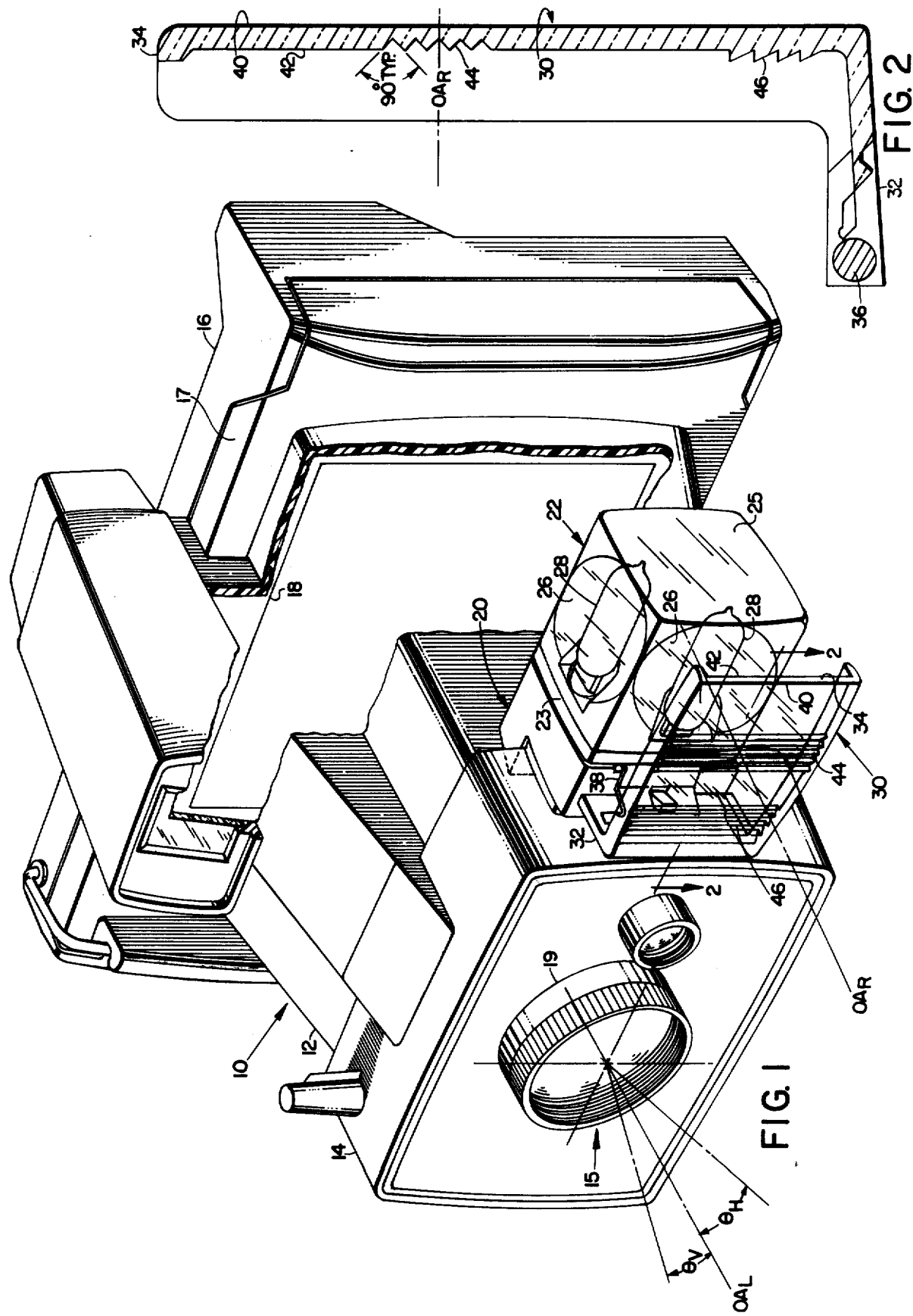

OPTICAL ELEMENT FOR REDISTRIBUTING THE LIGHT OUTPUT OF A PHOTOFLASH LAMP ASSEMBLY OR THE LIKE

BACKGROUND OF THE INVENTION

1. Field of the Invention

This invention relates generally to photographic apparatus for use in cameras that are adapted to utilize artificial lighting assemblies, e.g., a flashcube, to take flash pictures, and, more particularly, to optical configurations for apparatus for changing the angular light distribution of such artificial lighting assemblies in a preferred manner.

2. Description of the Prior Art

Flashcubes and linear flash arrays are well known commercially available artificial lighting assemblies which combine photoflash lamps with reflectors to illuminate scenes to be photographed. In such assemblies, the photoflash lamp has a principal diameter that is generally not small compared to the focal length of the reflector with which it is associated, typically being at least one-half as large. These assemblies typically do not have the same luminous intensity in all directions, and thus, the scene illumination which they provide is uneven. Characteristically, the intensity of the scene illumination is highest at the center of the scene and generally decreases with increasing distance away from the center. Therefore, subjects in the scene which are located near its edges receive less light than subjects located near the center of the scene, and are therefore darker than they should be in the resultant picture. Except in special situations like portraiture work, where uneven lighting may be desirable for aesthetic reasons, it is obviously more desirable in most amateur picture taking situations to have the scene illuminated as uniformly as possible so that each part of it receives equal emphasis, at least in terms of the illumination falling on it from the artificial lighting assembly.

Those skilled in the photographic arts who have found such uneven scene illumination characteristics objectionable have provided photographic apparatus for use with such artificial lighting assemblies to improve the uniformity of their characteristic illumination distribution to a level of uniformity which they have considered acceptable for their particular purposes.

One such example is disclosed in U.S. No. Des. 218,363 issued to James M. Conner et al on Aug. 11, 1970 and entitled "Light Deflector for a Photographic Camera". The light deflector in this patent comprises a transparent plate having a plurality of elongated, retroreflective type, V-shaped grooves which are separated from one another at equal intervals along the side of the transparent plate which faces the flashcube and operate to modify the light distribution of the flashcube to make it more uniform. While this deflector improves the uniformity of the illumination provided by the flashcube with which it is used, its particular arrangement of V-shaped grooves on the transparent deflector operates to refract light from the flashcube in such a manner so that the overall efficiency of the flashcube in combination with the deflector is reduced thereby reducing the maximum distance at which flash pictures may be taken using this combination.

Another example of an optical device for use with a flashcube is disclosed in U.S. Pat. No. 3,720,145 issued to Bruce K. Johnson et al on Mar. 13, 1973 and entitled "Portrait Camera Having Synchronized Flash Illumination Source". In this patent, a portrait camera is disclosed which has a Fresnel lens mounted in front of the flashcube to focus light from the flashcube into a relatively narrow and limited field angle substantially the same as that of the field of view of the camera. The Fresnel lens of this disclosure operates to generally reduce the angular extent of the flashcube's normal field coverage so that its light output is concentrated within the camera's field of view.

Thus, it is a primary object of the present invention to provide photographic apparatus for use with an artificial lighting assembly, such as a flashcube or a linear flash array, and to modify the distribution in scene illumination intensity provided by such an assembly to a preferred distribution which is more uniform over the field normally covered by the artificial lighting assembly.

Another object is to provide photographic apparatus for improving the uniformity of scene illumination provided by an artificial lighting assembly in an efficient manner.

Other objects of the invention will in part be obvious and will in part appear hereinafter. The invention accordingly comprises the apparatus possessing the construction, the combination of elements, and arrangement of parts which are exemplified in the following detailed disclosure.

SUMMARY OF THE INVENTION

The present invention relates to photographic apparatus for use with artificial lighting assemblies which may be used to illuminate photographic scenes. The artificial lighting assemblies are of the type whch include an inwardly curving reflector having a given focal length and an artificial light source having a principal diameter that is at least one-half of the focal length of the reflector and wherein the light source is positioned along the optical axis of the reflector so that the intensity of the illumination provided by the artificial lighting assembly at any point on a plane normal to the optical axis of the reflector decreases as the point's distance from the optical axis of the reflector increases.

The photographic apparatus comprises means for mounting the artificial lighting assembly so that light therefrom can be directed toward a scene to be photographed.

Additionally provided in the apparatus are optical means which are mounted in a predetermined spaced apart relationship with respect to the lighting assembly to intercept rays of light from the artificial lighting assembly to change the angular direction of travel of at least certain of such rays such that the distribution of illumination intensity provided by the artificial lighting assembly on the normal plane is changed to a preferred distribution which is more uniform over the normal plane. The optical means comprise a transparent, generally planar member having a first surface facing the scene and a second surface, spaced from the first surface, facing the artificial lighting assembly. The second surface is configured to define a refracting surface of predetermined size centrally disposed about the optical axis of the reflector. The index of refraction of the transparent member is selected and the refracting surface is structured to operate by total internal reflection to retroreflect rays from the scene which are incident normal to the first surface. Structured in this manner, rays from the artificial lighting assembly which are parallel with the optical axis of the reflector and incident on the refracting surface are deviated by the refracting surface to locations on the normal plane which are further removed from the optical axis of the reflector, and rays from the artificial lighting assembly which are incident on the refracting surface at angles oblique to the optical axis of the reflector are deviated by the refracting surface such that the distribution of the intensity of illumination on the normal plane attributed exclusively to such oblique rays remains substantially unchanged.

In one embodiment, the refracting surface of the apparatus comprises a plurality of contiguous, pyramidal concavities which face the artificial lighting assembly, and in another embodiment, the refracting surface of the apparatus comprises a plurality of contiguous, elongated V-shaped grooves which face the artificial lighting assembly.

BRIEF DESCRIPTION OF THE DRAWINGS

The novel features that are considered characteristic of the invention are set forth with particularity in the appended claims. The invention itself, however, both as to its organization and its method of operation, together with additional objects and advantages thereof, will best be understood from the following description of the preferred embodiment when read in connection with the accompanying drawings wherein like numbers have been employed in the different figures to denote the same parts and wherein:

FIG. 1 is a perspective view, with parts broken away, of a photographic camera in which the apparatus of this invention is incorporated;

FIG. 2 is a sectional view of a portion of the camera shown in FIG. 1 taken generally along line 2—2 of FIG. 1;

DESCRIPTION OF THE PREFERRED EMBODIMENT

Figure 7:
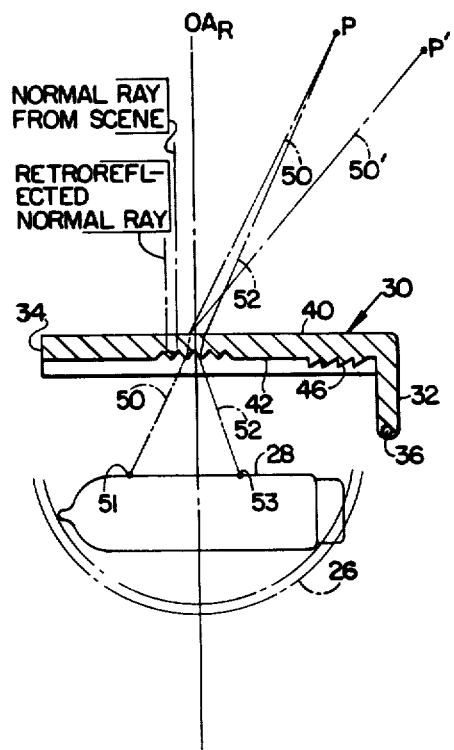
FIG. 7 is still another diagrammatic sectional view of the apparatus of FIG. 6.

Referring now to FIG. 1, there is shown a camera 10 in which the present invention is incorporated. The camera 10 is preferably of the type which has the capability for taking either ambient or flash pictures and comprises a main body section 12 which serves as the primary structural member for the camera 10 and, in addition, defines an opaque exposure chamber in which film may be positioned for exposure. Attached to the forward end of the main body section 12 is a shutter housing section 14 which includes an objective taking lens 15 for imaging light from the scene onto the film. The objective taking lens 15 may be a Cooke Triplet or similar multi-element type of lens which may have its focal length changed by adjusting the axial air spacing between its optical elements. This may be accomplished in a well-known manner by rotating a bezel, such as that designated at 19, coupled with a screw-threaded lens mount (not shown).

The main body section 12 also includes a rear housing section 17 which cooperates in a well-known manner with a movably attached door 16 to provide the camera 10 with a film receiving chamber which is adapted to receive a cassette of self-processable film units (not shown). Included in the rear housing section 17 is a rectangular film format aperture 18 which is positioned behind the objective taking lens 15 in a plane that is generally coincident with the plane of best focus for the objective taking lens 15, and which is substantially perpendicular to the optical axis, $OA_L$, of the objective taking lens 15. The peripheral edges of the film format aperture 18 and the objective taking lens 15, in combination, cooperate to provide the camera 10 with a field of view which is specified by the semi-field angles, $\theta_V$ for the vertical, and $\theta_H$ for the horizontal. The semi-field angles, $\theta_V$ and $\theta_H$, generally define the area in object space (the scene) that the camera 10 will record when a picture is taken. Because the film format aperture 18 is rectangular in shape, the vertical semi-field angle, $\theta_V$, is smaller than the horizontal semi-field angle, $\theta_H$.

Attached to the shutter housing 14 and in part to the main housing section 12 is a well-known mounting assembly 20 which is adapted to receive an artificial lighting assembly such as the flashcube designated at 22. For a detailed description of the flashcube mounting assembly 20, reference may be had to U.S. Pat. No. 3,545,354 issued to Willim J. McCune, Jr. on Dec. 8, 1970 and entitled "Photographic Exposure Control Apparatus" or to U.S. Pat. No. 3,589,254 issued to Bruce K. Johnson on June 29, 1971 and entitled "Exposure Control Mechanism for a Photographic Camera".

In the foregoing manner, means have been provided for mounting an artificial lighting assembly so that light therefrom can be directed toward a scene to be photographed.

The flashcube 22 comprises a base 23 by which it is retained in a well-known manner in the flashcube mount 20. Supported on the base 23 is a transparent container 25 in which is disposed a plurality of inwardly curving reflectors 26 each of which includes an optical axis, $OA_R$, and each of which has a given focal length. Positioned along the optical axis, $OA_R$, of each reflector 26 is an elongated, generally cylindrical artificial light source in the form of a photoflash lamp 28. Each photoflash lamp 28 has a principal diameter, D, (see FIG. 5) which is at least equal to one-half of the focal length of its corresponding reflector 26. Because their principal diameters, D, are large in relation to the focal length of their reflectors 26, the photoflash lamps 28 do not resemble point sources, but instead, must be considered as moderately extended sources which in combination with their reflectors 26 define an artificial lighting assembly whose luminous intensity is not the same in all directions. Typically, the intensity of the illumination provided by the flashcube 22, or by any artificial lighting assembly having similar characteristics, will not be evenly distributed over a scene to be photographed. Characteristically, the intensity of the illumination will be higher for objects located near the center of a photographic scene than for those located near its edges. The photographic result of such a characteristic lighting distribution will, as is apparent, be pictures which are darker towards their edges than at their center.

The degree of unevenness in the distribution of illumination intensity depends on the particular structure of an artificial lighting assembly and in general varies from one design to another. The characteristic distribution of illumination intensity for a particular artificial lighting assembly can either be calculated or accurately measured to determine its degree of nonuniformity. Thus, the distribution of illumination intensity which is characteristic of the flashcube 22 can be measured in accordance with the following method described in conjunction with the diagram of FIG. 3.

Figure 3:
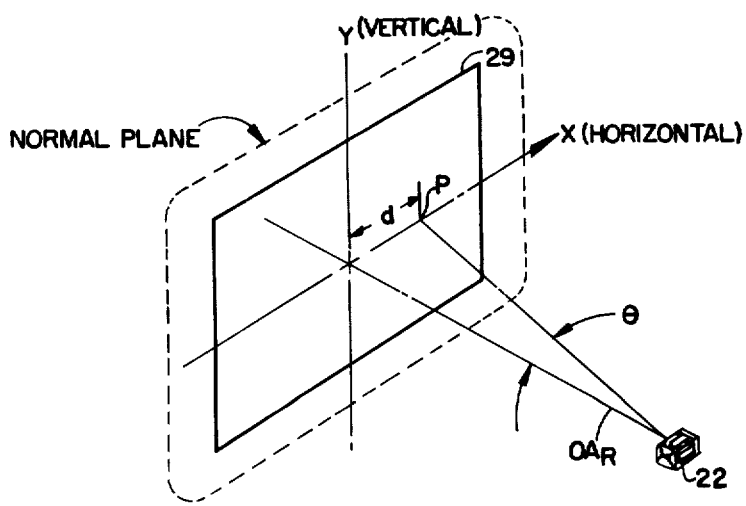
FIG. 3 is a diagrammatic perspective view of an artificial lighting assembly positioned forwardly of a normal plane in which the distribution of the lighting assembly's illumination may be measured.

Referring now to FIG. 3, the flashcube 22 is shown positioned forwardly of a plane defined by an orthogonal coordinate system (X-Y axis) whose origin is coincident with the optical axis, $OA_R$, of the reflector 26. The plane thus defined is arranged normal to the optical axis, $OA_R$, and is preferably spaced away from the flashcube 22 by a distance which is representative of the distances at which flash pictures are expected to be taken with the camera 10. Delineated on the normal plane is a rectangle 29 which generally defines the area which would be imaged within the field of view of the camera 10; the X-axis corresponding to the horizontal and the Y-axis corresponding to the vertical.

Once the normal plane is defined and the field of view of the camera is established on it, photo-integrators (not shown) are then placed on the plane at equally spaced apart points surrounding the origin or optical axis, $OA_R$. The flashcube 22 is then fired, the total flux at each point measured in some conventional units such as meter-candle-seconds, and the data tabulated in a form convenient for graphical presentation. For example, the location of the point P can be expressed in terms of its distance d from the origin or the angle $\theta$ which a line drawn from the point P to the flashcube 22 subtends with the optical axis, $OA_R$. Either convention for describing the location of all points on the normal plane is acceptable. However, for convenience the intensity of the illumination is preferably expressed in graphical format as a function of the angular location of each point.

Figure 4:
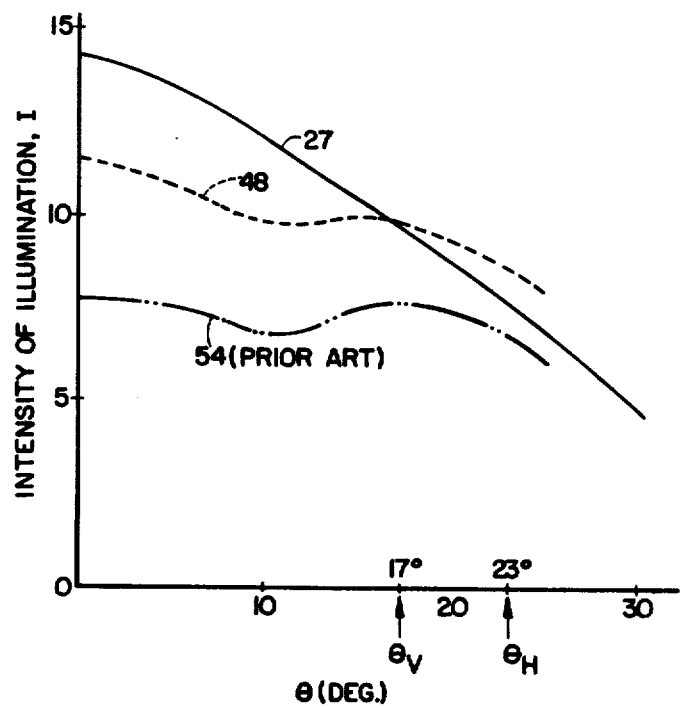
FIG. 4 is a graph which illustrates the lighting distribution of an artificial lighting assembly measured along the X-axis of the normal plane illustrated in FIG. 3 and the improvement in the lighting distribution of the artificial lighting assembly when used with the present invention.

A typical illumination distribution for the flashcube 22, measured in the foregoing manner along the X-axis of a normal plane approximately 5 ft. forward of the flashcube 22, is shown in FIG. 4 by the curve 27. The ordinate in FIG. 4 represents the intensity of the illumination, and the abscissa represents the angular field location of the points at which the intensity of the illumination was measured.

Referring now to curve 27 of FIG. 4, it can be seen that the intensity of the illumination at any point on the normal plane decreases as the point's distance from the optical axis, $OA_R$, increases or as the angular position, $\theta$, of the point increases. For $\theta$ equal to approximately 17 degrees, which is the vertical semi-field angle, $\theta_V$, for the camera 10, the intensity of the illumination is approximately 10 units, and for $\theta=0.0$ degrees, it is approximately 14.3 units. The difference in illumination intensity between these two points, expressed in stops $$(\Delta S = \log_2 \frac{I(17)}{I(0)})$$

is approximately $-0.5$ stops which is not considered objectionable for the camera 10 and the film with which it is used. However, for $\theta$ equal to 23°, which is the horizontal semi-field angle, $\theta_H$, for the camera 10, the difference is more significant, $-0.90$ stops, and is considered objectionable, i.e., too nonuniform because a subject located at 23° would receive approximately one-half as much light as one located on the optical axis, $OA_R$.

Curve 54 of FIG. 4 represents the distribution obtained along the X-axis using the prior art light deflector disclosed in U.S. Pat. No. Des. 218,363, supra, issued to Conner et al. Although curve 54 represents an improvement in uniformity compared to curve 27 for the bare flashcube 22, a comparison of the areas (total flux) under the curves 27 and 54, respectively, reveals that the improvement in uniformity of the prior art deflector is achieved with a considerable reduction in efficiency since the height of the curve 54 is about one-half that of the curve 27 at $\theta=0°$, and is less at all angles.

Referring now to FIGS. 1 and 2 there is shown optical means in the form of a transparent member 30 by which the foregoing objectionable nonuniformity in the distribution of illumination intensity of the flashcube 22 can be made more uniform over the normal plane. The member 30 comprises a tab section 32 which extends generally parallel to the optical axis, $OA_R$, and includes a pivot pin 36 which mates with a complementary configured spring-like clip 38 that functions to retain the member 30 on the flashcube mount 20 so that it is in a predetermined spaced apart relationship with the flashcube 22 as shown in FIG. 1. Depending from the tab section 32 is a generally planar section 34 that extends across the face of the flashcube 22 in a plane perpendicular to the optical axis, $OA_R$. The section 32 includes a first surface 40 which faces the scene to be photographed and a second surface 42, spaced from the first surface, and facing the flashcube 22. The second surface 42 includes a plurality of contiguous, elongated, retroreflective type, V-shaped grooves 44 whose apices also face the flashcube 22. The grooves 44 are arranged on the surface 42 and are centered about the optical axis, $OA_R$, so that their elongated dimension is perpendicular to the elongated dimension of each photoflash lamp 28 when a photoflash lamp 28 and its corresponding reflector is advanced in a well-known manner to the position illustrated in FIG. 1.

The index of refraction of the member 30 and the angle, $\theta_G$, (see FIG. 5) of the grooves 44 are selected so that the grooves 44 define a refracting surface which operates by total internal reflection to retroreflect rays from the scene which are incident normal to the first surface 40 (see FIG. 7). Because the grooves 44 are retroreflective, they cannot transmit light rays from the flashcube 22 to the normal plane or scene along directions in which the grooves 44 reflect light from the scene back on itself. Structured in this manner, the retroreflective grooves 44 operate to deviate rays from the flashcube 22 which are parallel with the optical axis, $OA_R$, and incident on the refracting surface defined by the grooves 44 (see FIG. 6) to locations in the normal plane (or the scene) which are further removed from the optical axis, $OA_R$, the grooves 44 thereby generally increasing the intensity of illumination at off-axis locations while generally decreasing the intensity of illumination on-axis. However, rays from the flashcube 22 which are incident on the grooves 44 at angles oblique to the optical axis, $OA_R$, are deviated by the grooves 44 such that the distribution of the intensity attributed exclusively to such oblique rays remains substantially unchanged.

To understand this latter effect, reference is now made to FIG. 7 which shows an oblique ray 50 emanating from the photoflash bulb 28 from a point 51 and traveling toward the second surface 42 at a predetermined angle. If the grooves 44 were not present in the member 30, i.e. the second surface 42 were flat, the ray 50 would exit the first surface 40 and reach some point P on the normal plane where it would make a given contribution to the intensity of the illumination at the point P. However, with the grooves 44 present, the ray 50 is refracted by one of the grooves 44 so that it exits the surface 40 and reaches another point P' on the normal plane by traveling along the path indicated by the exit ray 50'. Therefore with the grooves 44 present, the intensity at the point P might seem to be reduced by an amount corresponding to the contribution made by the ray 50 assuming that the grooves 44 were not present. However, the intensity of the point P due to oblique rays is not substantially changed with the grooves 44 because the contribution to the intensity of the point P that the ray 50 would have made absent the grooves 44 is replaced by another oblique ray 52 which originates from another point 53 on the photoflash lamp 28 and is refracted by one of the grooves 44 so that it reaches the point P upon exiting the surface 40. Thus, the grooves 44 have substantially no net effect on the distribution of illumination intensity due to the oblique rays since every oblique ray displaced from a point on the normal plane by the grooves 44 is replaced by a ray from some other part of the bulb.

Figure 8:
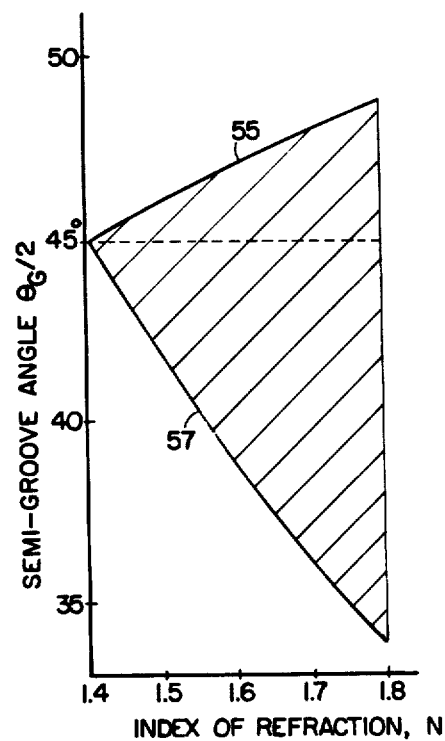
FIG. 8 is a graph which defines an envelope of angles and indices of refraction for certain portions of the apparatus of the present invention.

The grooves 44 of the present invention can be made retroreflective by selecting from FIG. 8 a combination of groove angle, $\theta_G$, and index of refraction for the material comprising the transparent member 30 from any point in the cross-hatched area bounded by the curves 55 and 57. It can be seen in FIG. 8 that the minimum semigroove angle, $\theta_{G/2}$, and index of refraction for which total internal reflection is possible is 45° and 1.414 respectively. The highest index will be dictated by the materials available and this in turn will determine what groove angles can be used successfully.

The transparent member 30 is preferably formed by injection molding as one integral part comprising a suitable optical plastic which preferably has an index of refraction of 1.492. Also each groove angle is preferably 90° so that each groove side is inclined at an angle of 45° with respect to the optical axis, $OA_R$.

Referring now to FIGS. 1 and 2, it can be seen that the transparent member 30 also includes on its second surface 42 a plurality of elongated prisms 46 which run parallel to the grooves 44. Each prism 46 includes one side parallel to the optical axis, $OA_R$, and another side at an oblique angle to the optical axis, $OA_R$. The grooves 46 operate in a conventional manner and are used to achieve secondary local increases in the intensity of illumination towards the edge of the field of view of the camera 10 by recapturing some energy from outside of the field of view of the camera 10 which would otherwise be unavailable.

Figure 5:
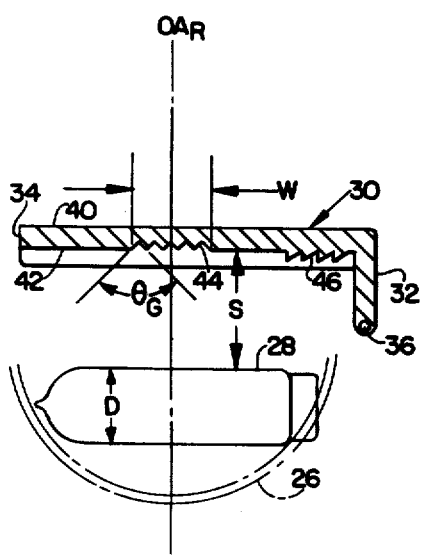
FIG. 5 is a diagrammatic sectional view showing the apparatus of this invention in combination with a conventional artificial lighting assembly.
Figure 6:
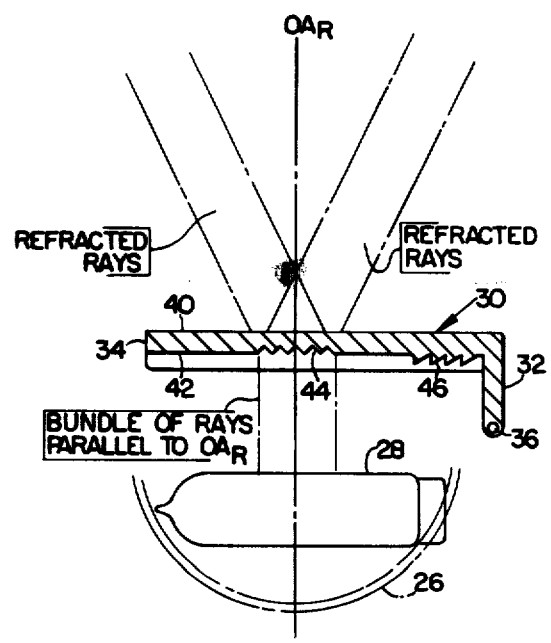
FIG. 6 is another diagrammatic sectional view showing the apparatus of this invention in combination with an artificial lighting assembly.

Referring now to FIG. 5, certain dimensional relationships between the flashcube 22 and the transparent member 30 can be seen to be illustrated diagrammatically. In particular, the distance, S, separating the second surface 42 from the nearest path of the photoflash lamp 28 is preferably substantially equal to the principal diameter, D, and the width, W, of the grooves 44 is also preferably substantially equal to the principal diameter, D.

Structured in the foregoing manner, the transparent member 30 operates to intercept rays of light from the flashcube 22 to change the angular direction of travel of at least certain of such rays such that the distribution of the illumination intensity provided by the flashcube 22 on the normal plane (curve 27) is changed to a preferred distribution which is more uniform over the normal plane.

Referring again to FIG. 4, there is shown a curve 48 which represents the variation in the intensity of the illumination provided by the flashcube 22 in combination with the member 30 as measured along the horizontal or X-axis in the normal plane. As can be seen from curve 48, the difference between the illumination on axis ($\theta=0.0$) and the illumination at the horizontal semifield angle, $\theta_H$, is now approximately $=0.42$ stops, and is significantly less compared to the previously discussed difference of $-0.9$ stops obtained with just the lone flashcube 22. Moreover, a comparison of the areas (total flux) under the curves 27 and 48, respectively, reveals that the improvement in uniformity is achieved with considerable efficiency. This is particularly noticeable in comparison with the prior art curve 54. Therefore, with the present invention, the range of the camera 10 is improved since the maximum distance at which flash pictures can be taken with the camera 10 depends on the total flux available. It will be readily apparent to those skilled in the art that the improvement in uniformity is maximum in the horizontal (X-axis) while remaining substantially unchanged in the vertical (Y-axis) because the grooves 44 are arranged perpendicular to the longitudinal dimension of the photoflash lamp 28. Nevertheless, the distribution is, in general, made more uniform over the entire normal plane.

Figure 9:
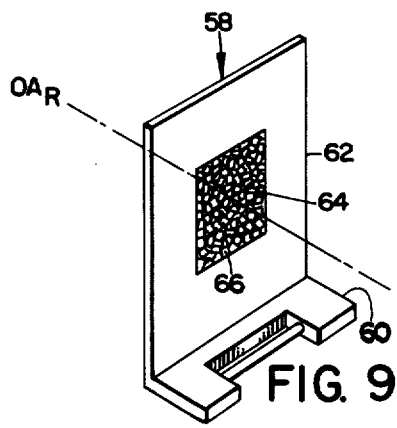
FIG. 9 is a perspective view of an alternate embodiment for the apparatus of the present invention.
Figure 10:
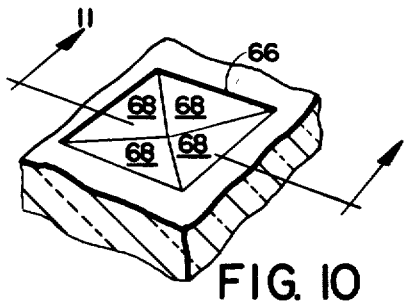
FIG. 10 is an enlarged broken-away perspective view of a portion of the alternate embodiment shown in FIG. 9.
Figure 11:
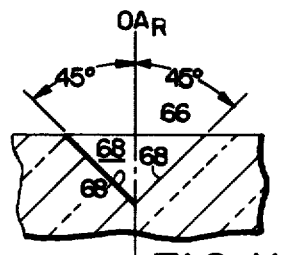
FIG. 11 is a cross-sectional view taken along line 11—11 of FIG. 10.

Referring now to FIG. 9, there is shown at 58 a transparent member which is an alternate embodiment of the present invention. The structure and material composition of the transparent member 58 is similar to that of the member 30 in that it has a tab section 60 which is substantially similar to the tab section 32 and a rectangular planar section 62 which is substantially similar to the planar section 34. However, the member 58 differs from the member 30 in that it is provided with a refracting surface 64 of predetermined size, centrally disposed about the optical axis, $OA_R$, which is comprised of a plurality of contiguous, retroreflective type, pyramidal concavities 66 which face the flashcube 22. FIG. 10 shows an enlarged perspective view of one such pyramidal concavity 66. As can be seen in that figure, eacy pyramidal concavity 66 comprises four sides 68, each of which, as shown in FIG. 11, is arranged at an angle of 45° with respect to the optical axis, $OA_R$. The open ends of the pyramidal concavities 66 are randomly arranged with respect to one another as shown in FIG. 9 and function in a manner similar to the grooves 44 of the member 30. However, the pyramidal concavities 66, unlike the grooves 44, operate to make the distribution of illumination intensity from the flashcube 22 symmetrically more uniform about the optical axis, $OA_R$.

Figure 12:
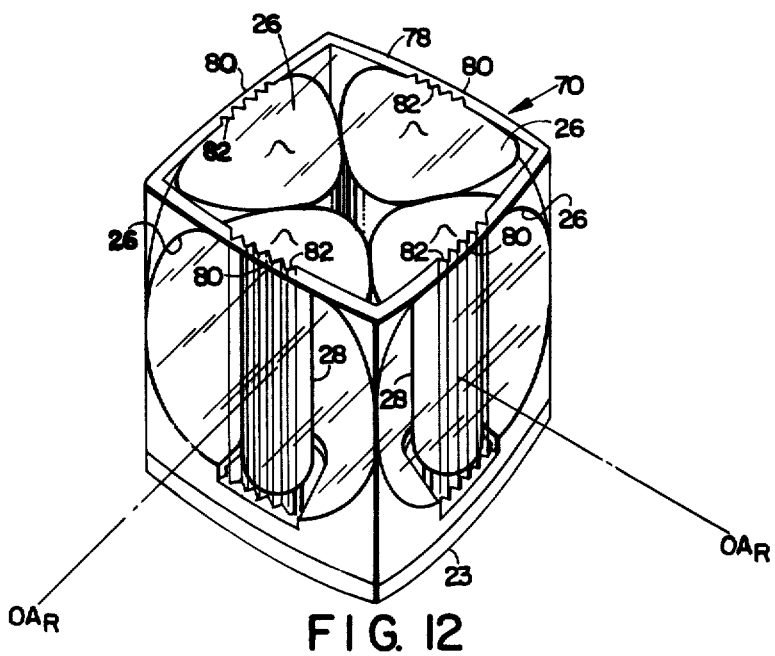
FIG. 12 is a perspective view of a lighting assembly which incorporates the features of the present invention.

Referring now to FIG. 12 where like numerals designate previously described elements, there is shown still another alternate embodiment comprising an artificial lighting assembly in the form of a flashcube 70. The flashcube 70 comprises a base or support member 23 on which is mounted four reflectors 26 each of which has a photoflash lamp 28 (only two shown) operatively associated therewith. A transparent container 78 is provided to cover the reflectors 26 and the lamps 28. The container 78 has four refracting regions 80 each of which comprises a plurality of elongated, contiguous, retroreflective, V-shaped grooves 82 which are centrally disposed about an optical axis, $OA_R$, of a corresponding reflector 26. The grooves 82 operate in the same manner as the grooves 44 of the member 30. Thus, the difference between this embodiment and the preferred embodiment is that the optical features of the member 30 are integrated with the transparent container 78. Otherwise the two embodiments are functionally similar.

Those skilled in the art may make still other changes according to the teachings of the present invention. For example, changes in the preferred embodiment may be made by changing the groove angle, $\theta_G$, the index of refraction, N, the width, W, of the grooves 44, or the distance, S, separating the rear surface 42 from the photoflash lamp 28 (see FIG. 5). Therefore, it is intended that all matter contained in the above description or shown in the accompanying drawings shall be interpreted as illustrative and not in a limiting sense.

What is claimed is:

1. Photographic apparatus for use with an artificial lighting assembly of the type which includes an inwardly curving reflector having a given focal length and optical axis and an artificial light source having a principal diameter that is at least one-half of the focal length of the reflector and wherein the light source is positioned along the optical axis of the reflector so that the intensity of the illumination provided by the artificial lighting assembly at any point on a plane normal to the optical axis of the reflector decreases as the point's distance from the optical axis of the reflector increases, said apparatus comprising:

means for mounting the artificial lighting assembly so that light therefrom can be directed toward a scene to be photographed; and optical means, mounted in a predetermined spaced apart relationship with the lighting assembly, for intercepting rays of light from the artificial lighting assembly to change the angular direction of travel of at least certain of such rays such that the distribution of illumination intensity provided by the artificial lighting assembly on the normal plane is changed to a preferred distribution which is more uniform over the normal plane, said optical means comprising a transparent, generally planar member having a first surface facing the scene and a second surface, spaced from said first surface, facing the artificial lighting assembly, said second surface being configured to define a refracting surface of predetermined size centrally disposed about the optical axis of the reflector, the index of refraction of said transparent member being selected and said refracting surface being structured to operate by total internal reflection to retroreflect rays from the scene which are incident normal to said first surface, rays from the artificial lighting assembly which are parallel with the optical axis of the reflector and incident on said refracting surface thereby being deviated by said refracting surface to locations on the normal plane which are further removed from the optical axis of the reflector, and rays from the artificial lighting assembly which are incident upon said refracting surface at angles oblique to the optical axis of the reflector being diviated by said refracting surface such that the distribution of the intensity of illumination on the normal plane attributed exclusively to such oblique rays remains substantially unchanged.

2. The apparatus of claim 1 wherein said refracting surface comprises a plurality of contiguous, pyramidal concavities which face the artificial lighting assembly.

3. The apparatus of claim 2 wherein each side of each pyramidal concavity is inclined at an angle of 45° with respect to the optical axis of the reflector and wherein the index of refraction of said transparent member is at least 1.414.

4. The apparatus of claim 3 wherein each pyramidal concavity has four equal sides.

5. The apparatus of claim 2 wherein said transparent planar member is rectangular in shape, and wherein the peripheral edges of said refracting surface define a rectangle whose center is coincident with the optical axis of the reflector, whose sides are parallel with the sides of said transparent planar member, and wherein at least one dimension of said refracting surface is substantially equal to the principal diameter of the light source.

6. The apparatus of claim 2 wherein said transparent generally planar member is substantially normal to the optical axis of the reflector and is spaced away from the artificial light source so that the nearest distance between said second surface of said transparent member and the light source is substantially equal to the principal diameter of the light source.

7. The apparatus of claim 2 wherein the openings of said pyramidal concavities are randomly oriented with respect to one another.

8. The apparatus of claim 1 wherein said refracting surface comprises a plurality of contiguous, elongated V-shaped grooves which face the artificial lighting assembly.

9. The apparatus of claim 8 wherein each side of each groove is inclined at an angle of 45° with respect to the optical axis of the reflector and wherein the index of refraction of said transparent member is at least 1.414.

10. The apparatus of claim 8 wherein the width of said refracting surface occupied by said grooves is substantially equal to the principal diameter of the light source.

11. The apparatus of claim 8 wherein said transparent generally planar member is substantially normal to the optical axis of the reflector and is spaced away from the artificial light source so that the nearest distance between said second surface and the light source is substantially equal to the principal diameter of the light source.

12. An artificial lighting assembly for use with photographic camera apparatus to illuminate a scene to be photographed, said assembly comprising:

a support member adapted to mount said lighting assembly so that light therefrom can be directed toward a scene to be photographed;

means mounted on said support member for defining at least one inwardly curving reflector having a given focal length and optical axis;

an artificial light source operatively associated with said at least one reflector, said light source having a principal diameter that is at least one-half of said focal length of said reflector and positioned along said optical axis of said reflector so that the intensity of the illumination provided by the combination of said reflector and said light source at any point on a plane normal to said optical axis of said reflector decreases as the point's distance from the optical axis of said reflector increases; and optical means, mounted on said support member in a predetermined spaced apart relationship with respect to said light source and said reflector, for intercepting rays of light from said light source and said reflector to change the angular direction of travel of at least certain of such rays such that the distribution of illumination intensity provided by the combination of said light source and said reflector on the normal plane is changed to a preferred distribution which is more uniform over the normal plane, said optical means comprising a transparent, generally planar member having a first surface facing the scene and a second surface, spaced from said first surface, facing said reflector and said light source, said second surface being configured to define a refracting surface of predetermined size centrally disposed about said optical axis of said reflector, the index of refraction of said transparent member being selected and said refracting surface being structured to operate by total internal reflection to retroreflect rays from the scene which are incident normal to said first surface, rays from said light source and said reflector which are parallel with said optical axis of said reflector and incident on said refracting surface thereby being deviated by said refracting surface to locations on the normal plane which are further removed from said optical axis of said reflector, and rays from said light source and said reflector which are incident on said refracting surface at angles oblique to said optical axis of said reflector being deviated by said refracting surface such that the distribution of the intensity of illumination on the normal plane attributed exclusively to such oblique rays remains substantially unchanged.

13. The assembly of claim 12 wherein said refracting surface comprises a plurality of contiguous, pyramidal concavities which face said light source and said reflector.

14. The assembly of claim 13 wherein each side of each pyramidal concavity is inclined at an angle of 45° with respect to said optical axis of said reflector and wherein the index of refraction of said transparent member is at least 1.414.

15. The assembly of claim 14 wherein each pyramidal concavity has four equal sides.

16. The assembly of claim 13 wherein said transparent planar member is rectangular in shape, and wherein the peripheral edges of said refracting surface define a rectangle whose center is coincident with said optical axis of said reflector, whose sides are parallel with the sides of said transparent planar member, and wherein at least one dimension of said refracting surface is substantially equal to said principal diameter of said light source.

17. The assembly of claim 13 wherein said transparent generally planar member is substantially normal to said optical axis of said reflector and is spaced away from said artificial light source so that the nearest distance between said second surface of said transparent member and said light source is substantially equal to said principal diameter of said light source.

18. The assembly of claim 13 wherein the openings of said pyramidal cancavities are randomly oriented with respect to one another.

19. The assembly of claim 12 wherein said light source has a generally elongated cylindrical shape and wherein said refracting surface comprises a plurality of contiguous, elongated V-shaped grooves which face said light source and said reflector and have their elongated dimension arranged substantially perpendicular to the elongated dimension of said light source.

20. The assembly of claim 19 wherein each side of each groove is inclined at an angle of 45° with respect to said optical axis of said reflector and wherein the index of refraction of said transparent member is at least 1.414.

21. The assembly of claim 19 wherein the width of said refracting surface occupied by said grooves is substantially equal to said principal diameter of said light source.

22. The assembly of claim 19 wherein said transparent generally planar member is substantially normal to said optical axis of said reflector and is spaced away from said artificial light source so that the nearest distance between said second surface and said light source is substantially equal to said principal diameter of said light source.

* * * * *